US012756086B2

(12) United States Patent
Araki et al.

(10) Patent No.: US 12,756,086 B2
(45) Date of Patent: Oct. 6, 2026

(54) ANTENNA AND WIRELESS TERMINAL PROVIDED WITH SAME

(71) Applicant: Panasonic Intellectual Property Management Co., Ltd., Kadoma (JP)

(72) Inventors: Kota Araki, Osaka Fu (JP); Sohui Jeon, Osaka Fu (JP); Kenji Shibata, Osaka Fu (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 105 days.

(21) Appl. No.: 18/579,049

(22) PCT Filed: Jun. 13, 2022

(86) PCT No.: PCT/JP2022/023558

§ 371 (c)(1),
(2) Date: Jan. 12, 2024

(87) PCT Pub. No.: WO2023/286505

PCT Pub. Date: Jan. 19, 2023

(65) Prior Publication Data

US 2024/0304981 A1 Sep. 12, 2024

(30) Foreign Application Priority Data

Jul. 13, 2021 (JP) ................................ 2021-115671

(51) Int. Cl.
*H01Q 1/22* (2006.01)
*H01Q 1/38* (2006.01)

(52) U.S. Cl.
CPC ................ *H01Q 1/22* (2013.01); *H01Q 1/38* (2013.01)

(58) Field of Classification Search
CPC ........... H01Q 1/22; H01Q 1/38; H01Q 1/243; H01Q 3/245; H01Q 3/2647; H01Q 15/02; H01Q 15/148; H01Q 21/062
See application file for complete search history.

(56) References Cited

U.S. PATENT DOCUMENTS

| | | | | |
|---|---|---|---|---|
| 8,174,452 | B2 * | 5/2012 | Ayala Vazquez ........ | H01Q 1/36 343/702 |
| 8,811,511 | B2 * | 8/2014 | Sayeed ................. | H01Q 15/02 343/912 |
| 2009/0051620 | A1 | 2/2009 | Ishibashi et al. | |

(Continued)

FOREIGN PATENT DOCUMENTS

| | | |
|---|---|---|
| CN | 101180765 A | 5/2008 |
| CN | 108632509 A | 10/2018 |

(Continued)

OTHER PUBLICATIONS

International Search Report dated Aug. 23, 2022, issued in counterpart International Application No. PCT/JP2022/023558 (4 pages).

*Primary Examiner* — Tung X Le
(74) *Attorney, Agent, or Firm* — WHDA, LLP

(57) ABSTRACT

A transparent antenna is for use in a wireless terminal (100) including an imaging device having a plurality of pixels (21) arranged in an array and a camera lens (22) arranged above the imaging device. The transparent antenna is formed by an antenna pattern (31) included in an antenna base (32) provided above the camera lens (22).

16 Claims, 6 Drawing Sheets

(56) References Cited

U.S. PATENT DOCUMENTS

| | | | | |
|---|---|---|---|---|
| 2009/0140938 | A1 | 6/2009 | Ishibashi et al. | |
| 2018/0159244 | A1* | 6/2018 | Tzuang | H01Q 3/245 |
| 2018/0267138 | A1* | 9/2018 | Sakurai | H01Q 15/02 |
| 2019/0097301 | A1* | 3/2019 | Wu | H05K 5/03 |
| 2019/0393613 | A1 | 12/2019 | Kakuya et al. | |
| 2021/0280974 | A1* | 9/2021 | Yum | H04B 5/20 |
| 2021/0329110 | A1* | 10/2021 | Wu | H04M 1/72412 |
| 2022/0201838 | A1 | 6/2022 | Suzuki et al. | |
| 2022/0321748 | A1* | 10/2022 | Lee | G06F 1/1605 |
| 2024/0128656 | A1* | 4/2024 | Hofman | H01Q 19/062 |

FOREIGN PATENT DOCUMENTS

| | | | |
|---|---|---|---|
| JP | 2010085505 | A | 4/2010 |
| JP | 2018-142872 | A | 9/2018 |
| WO | 2018/186375 | A1 | 10/2018 |
| WO | 2020/226049 | A1 | 11/2020 |

* cited by examiner

ANTENNA AND WIRELESS TERMINAL PROVIDED WITH SAME

CROSS REFERENCE TO RELATED APPLICATIONS

This Application is the National Stage of International Application No. PCT/JP2022/023558, filed on Jun. 13, 2022, which claims priority from Application No. 2021-115671 filed on Jul. 13, 2021 in Japan. The entire contents of these applications are incorporated herein by reference in their entirety.

TECHNICAL FIELD

The present disclosure relates to an antenna and a wireless terminal provided with the antenna.

BACKGROUND ART

A wireless terminal having a wireless communication function, such as a smartphone, includes an antenna for acquiring external information and transmitting information to the outside. For example, in a touch panel module (wireless terminal) of Patent Document 1, an antenna pattern is present in a region extending from an end portion of a cover glass or a cover film.

CITATION LIST

Patent Document

Patent Document 1: Japanese Unexamined Patent Publication No. 2018-142872

SUMMARY OF THE INVENTION

Technical Problem

As described above, in the touch panel module of Patent Document 1, the antenna pattern is present in the region extending from the end portion of the cover glass or the cover film, and therefore, when a user operates the touch panel module or makes a call, a user's hand or ear may contact the antenna pattern. When the user's hand or ear contacts the antenna pattern, antenna sensitivity may be degraded. Although it is conceivable to use a plurality of antennas in combination in order to stabilize communication, the installation locations of the antennas in the wireless terminal are limited.

The present disclosure was made in view of the problems. It is an objective of the present disclosure to provide an antenna capable of performing stable communication while ensuring an antenna installation location.

Solution to the Problem

In order to achieve the objective, a transparent antenna according to an aspect of the present disclosure is a transparent antenna for use in a wireless terminal including: an imaging device having a plurality of pixels arranged in an array; and a camera lens arranged above the imaging device, and the transparent antenna is formed by an antenna pattern included in an antenna base provided above the camera lens.

Advantages of the Invention

According to the present disclosure, it is possible to perform stable communication while ensuring the antenna installation location.

DESCRIPTION OF EMBODIMENTS

Embodiments of the present disclosure will be described below in detail with reference to the drawings. The following description of the embodiments is merely exemplary in nature and is not intended to limit the present disclosure, its application, or its uses.

Figure 1:
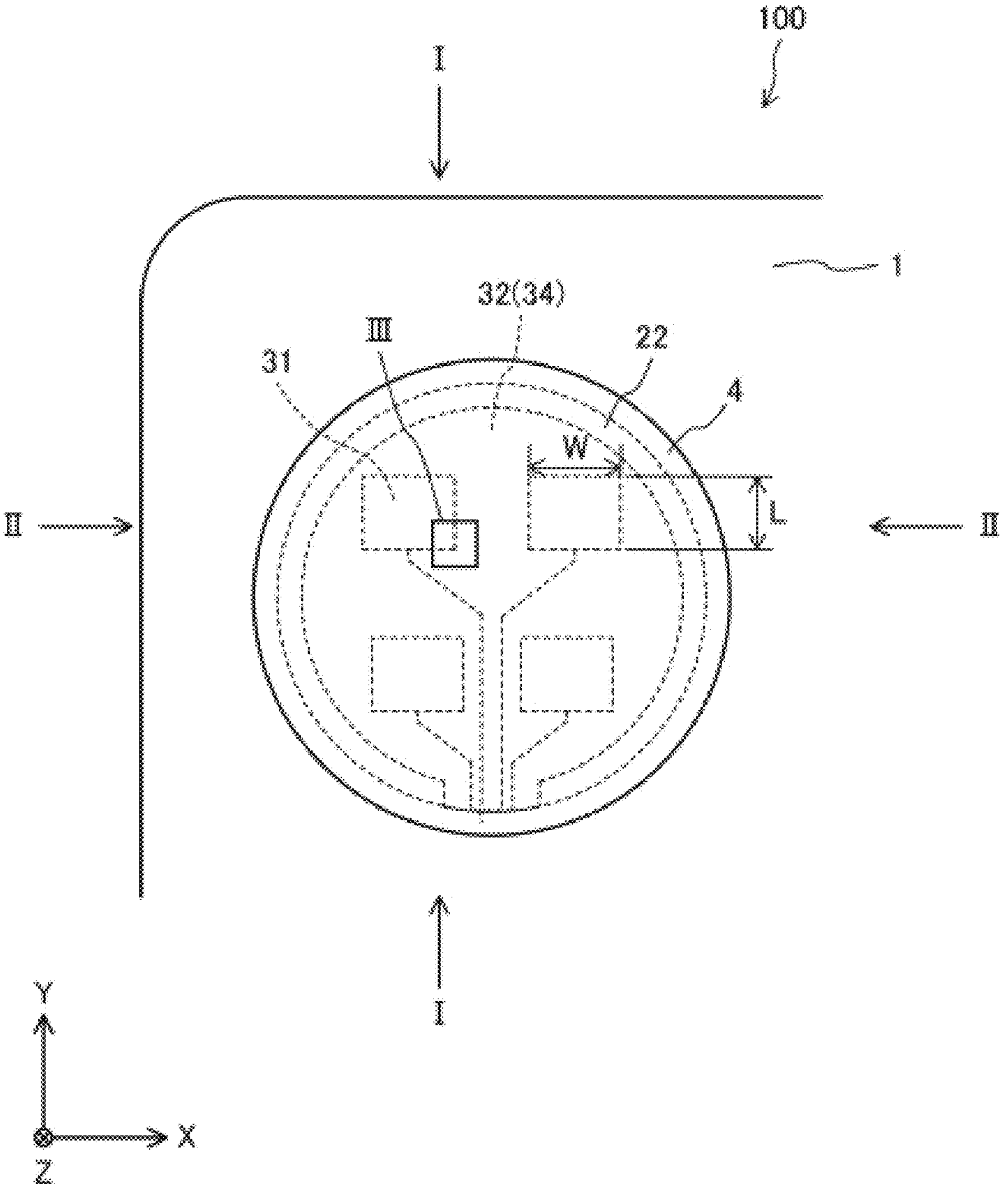
FIG. 1 is an enlarged view of the periphery of a camera unit of a wireless terminal according to an embodiment of the present disclosure.

FIG. 1 illustrates the periphery of a camera unit 2 of a wireless terminal 100 according to an embodiment of the present disclosure. The wireless terminal 100 has at least a communication function with an external device and a camera function of capturing an external image. The wireless terminal 100 is a wireless terminal having a wireless communication function, such as a smartphone, a mobile phone, a tablet, a wristwatch-type electronic device, a digital camera, a video camera, and a pen-type microscope.

Figure 2:
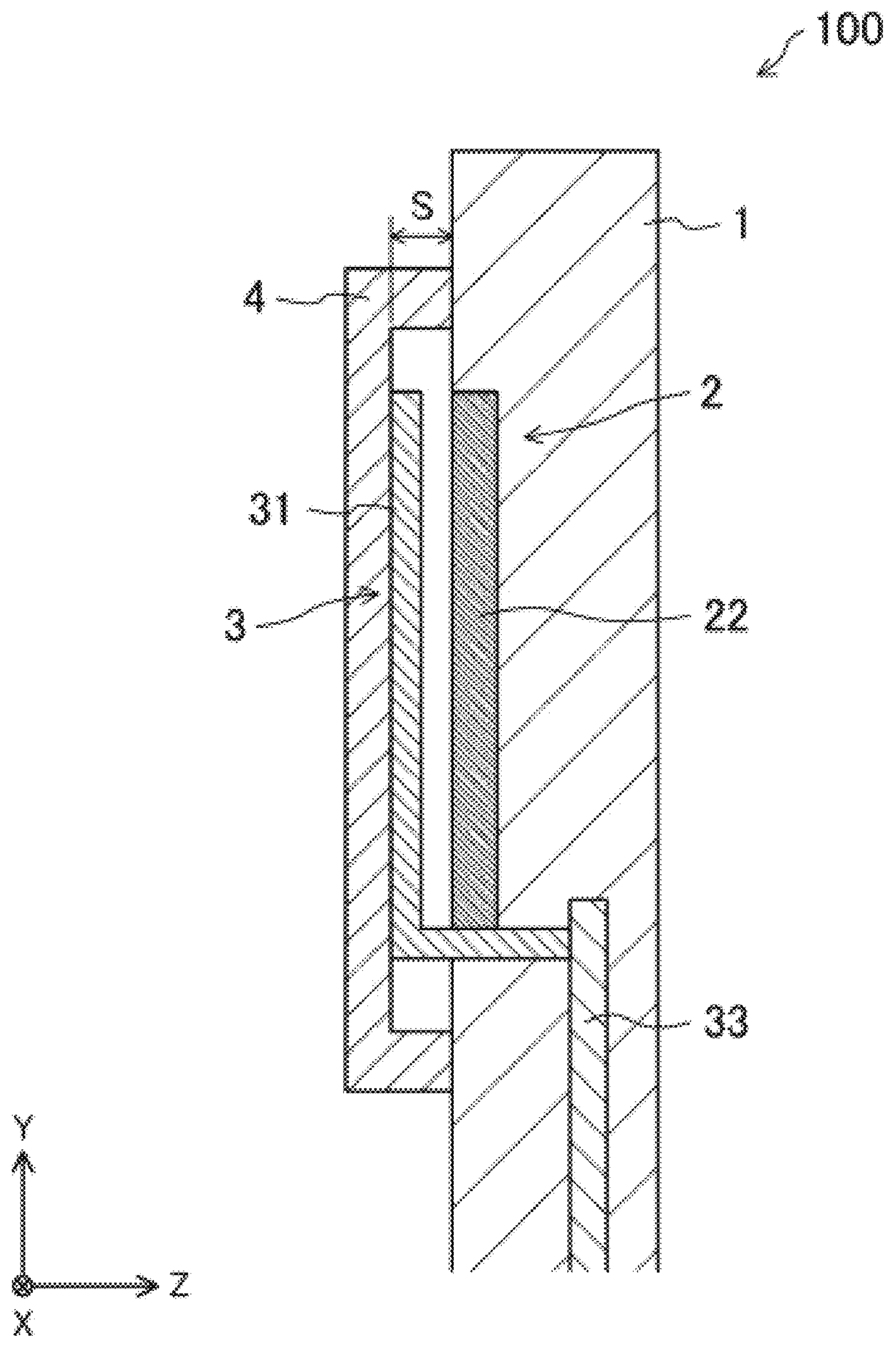
FIG. 2 is a cross-sectional view taken along line I-I of FIG. 1.

As illustrated in FIGS. 1 and 2, the wireless terminal 100 includes a main body 1, the camera unit 2, an antenna unit 3, and a cover glass 4. In the following description, the main body 1 is located on a "lower side" of the wireless terminal 100, whereas the opposite side on which the cover glass 4 is located is referred to as an "upper side" of the wireless terminal 100. With these terms, a positional relationship between elements forming the wireless terminal 100 will be defined. Such a positional relationship has nothing to do with an actual direction of the wireless terminal 100.

(Camera Unit)

The camera unit 2 includes a plurality of pixels 21 (imaging devices) and a camera lens 22. Although not shown in FIGS. 1 and 2, the plurality of pixels 21 is arranged in an array along the upper surface of the main body 1. The camera lens 22 is arranged on the upper side of the plurality of pixels 21. The plurality of pixels 21 is connected to a drive circuit (not shown) formed in the main body 1, and outputs pixel signals in response to a signal from the drive circuit. The wireless terminal 100 generates (captures) an external image based on the pixel signal output from each pixel 21.

(Antenna Unit)

The antenna unit 3 is an antenna module, such as a patch antenna, which performs transmission and reception to and from an external device. The antenna unit 3 includes an antenna pattern 31 (transparent antenna) and an antenna base 32. In the following description, a case where the antenna pattern 31 is a patch antenna and the wireless terminal 100 is a smartphone will be described as an example.

As illustrated in FIG. 1, in the present embodiment, the antenna unit 3 includes four antenna patterns 31 arranged in a 2×2 array. The antenna pattern 31 is formed in the antenna base 32.

As illustrated in FIG. 2, each antenna pattern 31 is connected to a radio frequency module (RFM) base 33 formed in the main body 1. The antenna unit 3 receives an RF signal from an external device via the antenna pattern 31. The antenna unit 3 outputs the received RF signal to an RF circuit (not shown) formed in the main body 1 via the RFM base 33. The antenna unit 3 receives a transmission signal output from the RF circuit via the RFM base 33. The antenna unit 3 transmits the received transmission signal to an external device via the antenna pattern 31.

(Cover Glass)

The cover glass 4 is arranged on the upper surface side of the camera lens 22 so as to cover the camera lens 22. The cover glass 4 is made of, for example, a glass material. The cover glass 4 is formed to have a diameter in a rage, for example, of about 10 mm to 30 mm.

As illustrated in FIG. 1, the cover glass 4 has substantially the same size as the camera lens 22 as viewed in plan view, and is arranged so as to overlap with the camera lens 22. Thus, the entire camera lens 22 is covered with the cover glass 4 as viewed in plan view, thereby making it possible to reduce the influence on imaging by the camera unit 2.

As illustrated in FIG. 2, the cover glass 4 is arranged with a gap S from the main body 1 (camera lens 22). The antenna pattern 31 is arranged on the lower surface of the cover glass 4. The antenna pattern 31 is formed on the lower surface of the cover glass 4, so that the antenna pattern 31 can be arranged apart from the main body 1, and therefore, antenna performance can be improved.

(Antenna Base)

Figure 3:
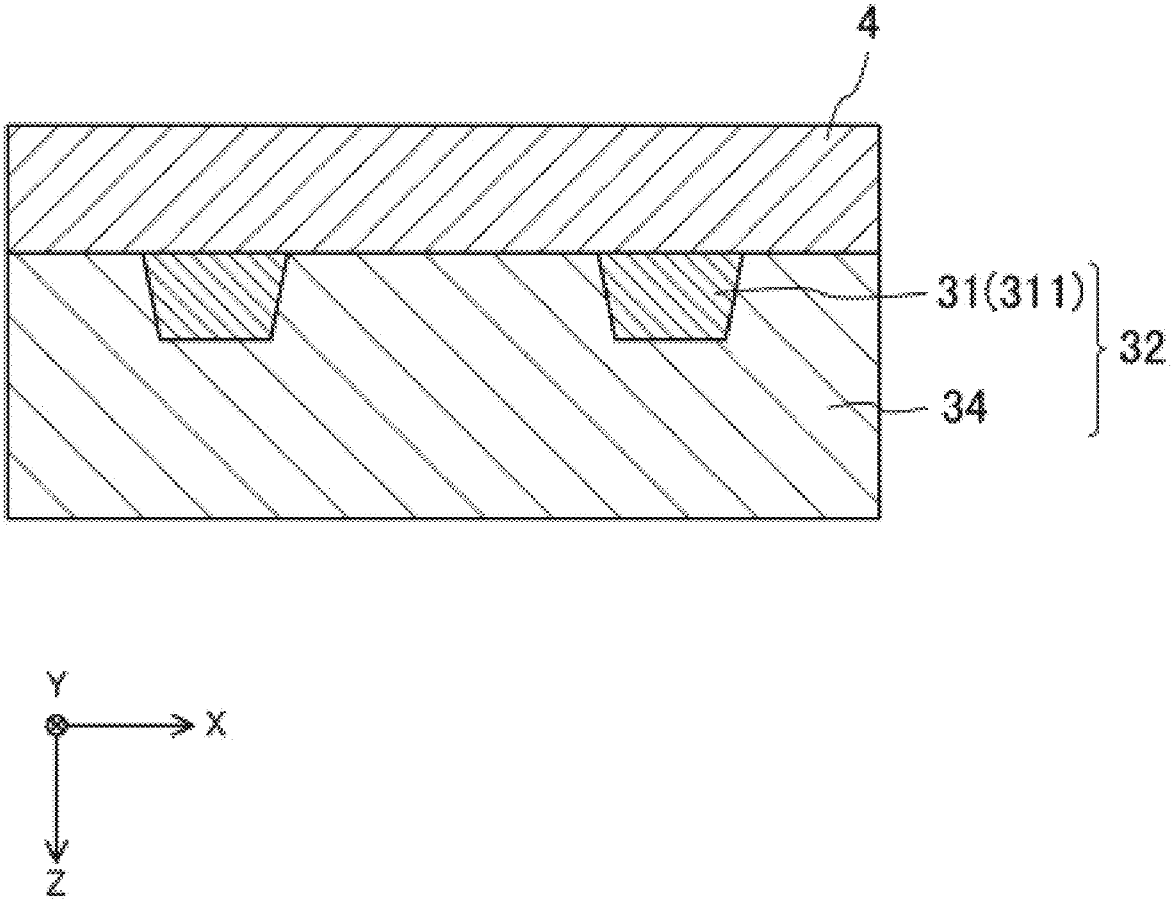
FIG. 3 is a cross-sectional view taken along line II-II of FIG. 1.

The antenna base 32 is formed in a film shape. As illustrated in FIG. 3, the antenna base 32 is arranged on the lower surface of the cover glass 4. The antenna base 32 includes a transparent base 34 (film base). The transparent base 34 is made of a material, such as a transparent resin film of polyethylene terephthalate (PET), cycloolefin polymer (COP), or the like, and transparent glass.

The antenna pattern 31 is formed between the cover glass 4 and the transparent base 34. The antenna pattern 31 (specifically, metal thin wire 311 described later) may be embedded in the transparent base 34. In this case, the antenna pattern 31 is formed in a groove formed in the surface of the transparent base 34. The groove may be provided in a thin resin film portion layered on the surface of the transparent base 34. That is, the transparent base 34 may also include a transparent base having a plurality of layers.

As illustrated in FIG. 1, the size of the antenna base 32 is about the same as the size of the cover glass 4 as viewed in plan view. It is thus possible to reduce reflection at an end portion of the antenna base 32 and therefore possible to reduce the influence on imaging by the camera unit 2. A similar effect can be obtained even if the size of the antenna base 32 is about the same as or larger than the size of the cover glass 4.

(Antenna Pattern)

As illustrated in FIG. 1, the antenna pattern 31 is formed in a rectangular sheet shape as viewed in a plan view. The antenna unit 3 is designed such that a width W in an X direction and a width L in a Y direction are each a wavelength 2/2 of a design frequency. For example, in a 28 GHz frequency band, which is the frequency band of a fifth generation mobile communication system (5G), the widths W and L are each formed to be about 5.35 mm in vacuum. In a case where the antenna pattern 31 is arranged in the transparent base 34, the widths W and L are shortened due to the permittivity of the transparent base 34. For example, in a case where the transparent base 34 is polyethylene terephthalate (PET) with a thickness of 100 μm, the widths W and L can be about 2.9 mm which is smaller than 5.35 mm, and such an antenna pattern 31 is useful for a frequency band of 28 GHz. In a case where the transparent base 34 is cycloolefin polymer (COP) with a thickness of 100 μm, the widths W and L can be about 3.3 mm which is smaller than 5.35 mm, and such an antenna pattern 31 is useful for a frequency band of 28 GHz. Thus, the antenna unit 3 can be arranged so as to overlap with the camera unit 2 as viewed in plan view.

Figure 4:
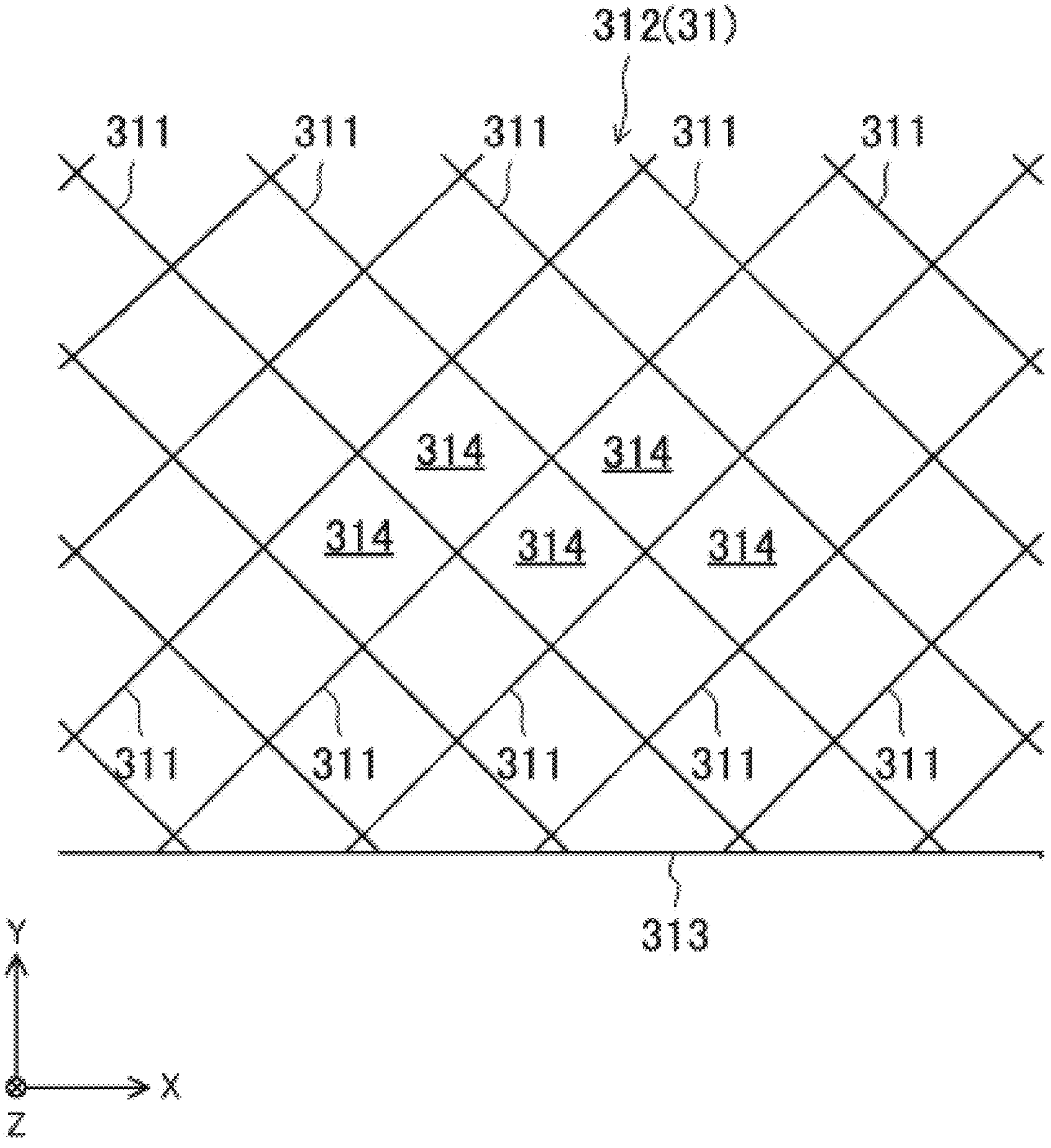
FIG. 4 is a partially-enlarged view of a portion III of FIG. 1.

As illustrated in FIG. 4, the antenna pattern 31 includes a mesh pattern 312. In this embodiment, the mesh pattern 312 is formed by conductive metal thin wires 311, 311, . . . intersecting each other and arranged at equal intervals. The metal thin wires 311, 311, . . . are not necessarily arranged at equal intervals.

The metal thin wire 311 is formed such that a dimension of width A is, for example, 2.5 μm or less.

Each metal thin wire 311 is connected to a connection terminal 313. Each metal thin wire 311 extends in a direction diagonal to each of the X-axis direction and the Y-axis direction. Specifically, the metal thin wire 311 intersects the connection terminal 313 such that the direction along the wire obliquely crosses the connection terminal 313. The connection intersections between the metal thin wires 311, 311, . . . and the connection terminal 313 are arranged at intervals in the longitudinal direction (X-axis direction) of the connection terminal 313. Each metal thin wire 311 is connected to the RFM base 33 via the connection terminal 313. The connection terminal 313 is not necessarily provided. In this case, each metal thin wire 311 is connected to the RFM base 33 without the connection terminal 313.

The mesh pattern 312 has a mesh structure in which a plurality of cells 314, 314, defined by thin wires are regularly arranged. Each of the cells 314 has the same size and has a square shape with two diagonal lines (not shown) of the same length. The shape of each cell 314 may be a parallelogram or a rhombus.

As described above, the antenna unit 3 includes: the antenna pattern 31 including the plurality of metal thin wires 311; and the transparent base 34. The antenna unit 3 therefore has a transmittance of a predetermined value or more (e.g., 80% or more). Thus, light can pass through the antenna unit 3, and therefore, the influence on imaging by the camera unit 2 can be reduced.

Figure 5:
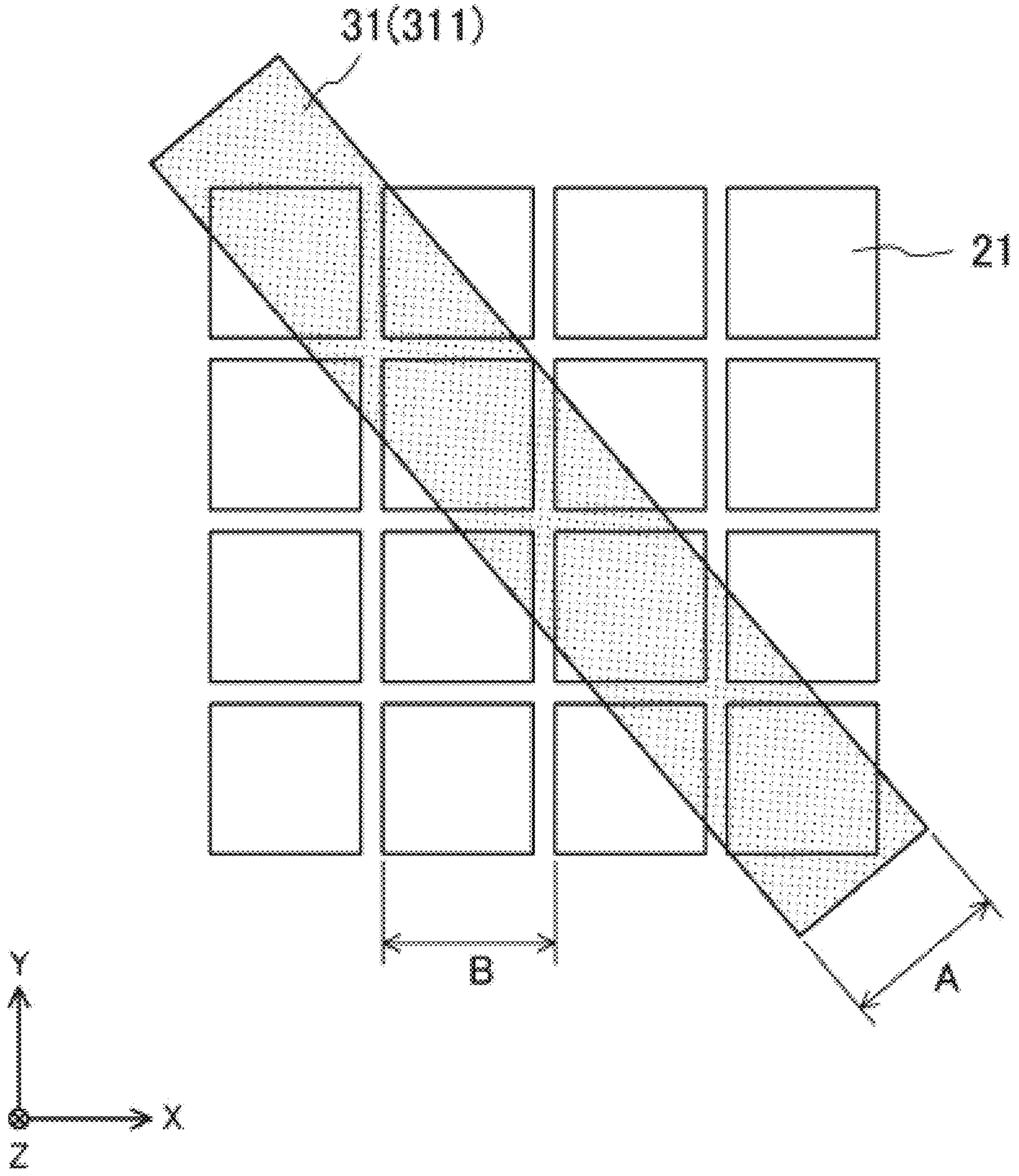
FIG. 5 is a diagram illustrating an arrangement relationship between pixels and thin metal wires as viewed in plan in the wireless terminal according to the embodiment of the present disclosure.

As described above, the width A of the metal thin wire 311 is 2.5 μm or less. The pitch B of the pixels 21 is about 1.4 μm. Thus, the width A of the metal thin wire 311 and the pitch B of the pixels 21 are about the same (see FIG. 5). This can reduce the influence on imaging by the camera unit 2. The interval between the metal thin wires 311 is set to be greater than the pitch B of the pixels 21, thereby making it possible to further reduce the influence on imaging by the camera unit 2.

The antenna pattern 31 is arranged at a position lower than a position from the plurality of pixels 21 to a shortest imaging distance of the camera unit 2. The shortest imaging distance refers to a distance from a subject to the plurality of pixels 21 when the camera lens 22 can focus on the subject. That is, the antenna pattern 31 is arranged at a position lower than the position from the plurality of pixels 21 to the shortest imaging distance of the camera unit 2; therefore, the metal thin wires 311 forming the antenna pattern 31 are not imaged. This can reduce the influence on imaging by the camera unit 2.

Figure 6A:
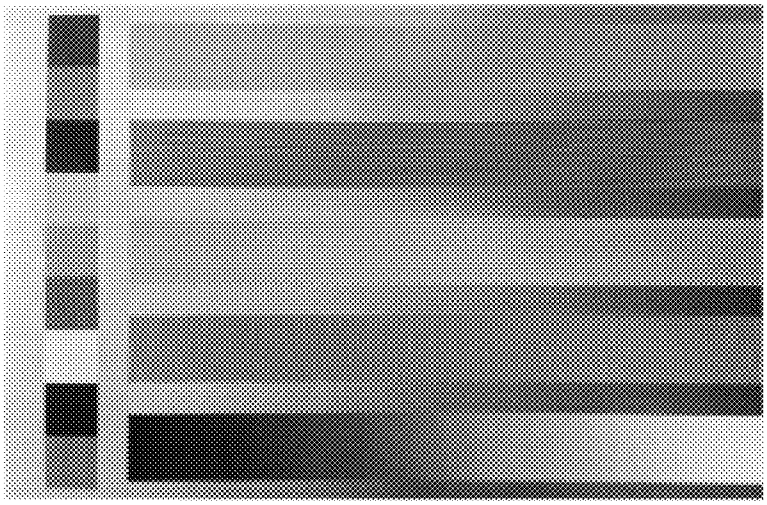
FIGS. 6A and 6B are images captured by the wireless terminal according to the embodiment of the present disclosure and by a wireless terminal without an antenna unit above a camera unit.
Figure 6B:
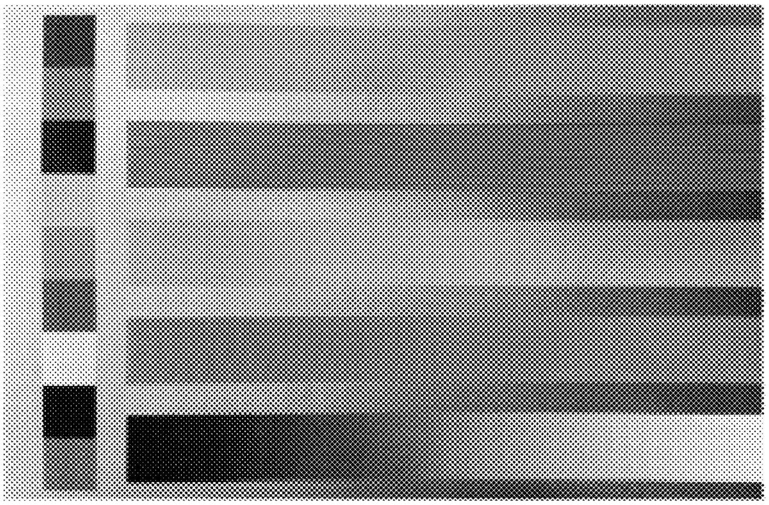

FIG. 6A is an image captured by the camera unit 2 in which the antenna unit 3 is provided above the camera unit 2. FIG. 6B is an image captured by the camera unit 2 in which the antenna unit 3 is not provided above the camera unit 2. FIGS. 6A and 6B show that there is almost no difference in the quality of the image captured by the camera unit 2 even if the antenna unit 3 is provided above the camera unit 2.

Advantageous Effects of Embodiment

As described above, in the wireless terminal 100, the antenna unit 3 including the antenna pattern 31 is arranged above the camera lens 22. This makes it possible to ensure a place for installing the antenna. The camera lens 22 is arranged at a position where it is less likely that the user touches the camera lens 22 with their finger or hand, in order to capture an external image. The antenna unit 3 is arranged above the camera lens 22, thereby making it possible to reduce a chance that a finger or hand of the user may touch the antenna pattern 31 and therefore possible to achieve stable communication.

The antenna unit 3 has a transmittance of the predetermined value or more. Thus, light can pass through the antenna unit 3; therefore, the influence on imaging by the camera unit 2 can be reduced.

The antenna pattern 31 is formed of the plurality of metal thin wires 311. Thus, light can pass through the antenna pattern 31; therefore, the influence on imaging by the camera unit 2 can be reduced.

The width A of the metal thin wire 311 is about the same as the pitch B of the pixels 21. This can reduce the influence on imaging by the camera unit 2.

The antenna unit 3 is arranged at a position lower than the position from the plurality of pixels 21 to the shortest imaging distance of the camera unit 2 (plurality of pixels 21). Thus, the metal thin wires 311 forming the antenna pattern 31 are not imaged; therefore, the influence on imaging by the camera unit 2 can be reduced.

The cover glass 4 is arranged on the upper surface side of the camera lens 22 so as to cover the camera lens 22. The antenna unit 3 is arranged on the lower surface of the cover glass 4. With this configuration, the antenna pattern 31 can be arranged apart from the main body 1 of the wireless terminal 100, and therefore, the antenna performance can be improved.

The antenna base 32 is about the same size as or larger than the cover glass 4 as viewed in plan view. It is thus possible to reduce reflection at an end portion of the antenna base 32 and therefore possible to reduce the influence on imaging by the camera unit 2.

The cover glass 4 is larger than the camera lens 22 as viewed in plan view. Thus, the entire camera lens 22 is covered with the cover glass 4 as viewed in plan view, thereby making it possible to reduce the influence on imaging by the camera unit 2.

Further, the antenna pattern 31 can be adapted to a frequency band of 5G or more, and the widths W and L of the antenna pattern 31 can be made smaller than the dimension of the camera lens 22 as viewed in plan view. Thus, the antenna pattern 31 can be arranged above the camera unit 2 so as to overlap with the camera unit 2.

The 5G frequency band is from 3.7 GHz band to 39 GHz band, and in the case of the patch antenna, the widths W and L of the antenna pattern 31 are each about 41.6 mm to 3.8 mm in vacuum. In a case where the antenna pattern 31 is arranged in the transparent base 34, the widths W and L are shortened due to the permittivity of the transparent base 34. For example, in a case where the transparent base 34 is polyethylene terephthalate (PET) with a thickness of 100 μm, the widths W and L can be about 22.5 mm to 2.1 mm. Here, the size of the cover glass may be appropriately set according to the widths W and L of the antenna patterns 31. The shape of the cover glass is not limited to a circular shape, and may be, for example, a rectangular, polygonal, or elliptical shape.

The antenna unit 3 has two or more antenna patterns 31. This configuration makes it possible to improve antenna sensitivity.

OTHER EMBODIMENTS

In the above-described embodiment, the antenna pattern 31 is formed of the plurality of metal thin wires 311, but is not limited thereto. The antenna pattern 31 may be formed of a metal plate made of transparent metal such as indium tin oxide (ITO) or PEDOT. The above-described effects can be obtained by the antenna pattern 31 formed of the transparent metal. However, the above-described embodiment is preferable because of a lower resistance value and hence a smaller loss of the antenna in the antenna pattern 31 formed of the metal thin wires 311.

In the above-described embodiment, the antenna unit 3 (antenna pattern 31) has been illustrated as the patch antenna as an example. However, the antenna unit 3 is not limited thereto, and may be another type of antenna. For example, the antenna unit 3 may be, for example, a dipole antenna or a monopole antenna. Even in this case, effects similar to those of the above-described embodiment can be obtained as long as the antenna pattern is formed of the metal thin wires. For example, in the 5G frequency band, in the case of a dipole antenna, a conductor wire is designed such that $\lambda/2$=about 41.6 mm to 3.8 mm in vacuum. In a case where the antenna pattern 31 is arranged in the transparent base 34, the widths W and L are shortened due to the permittivity of the transparent base 34. For example, in a case where the transparent base 34 is polyethylene terephthalate (PET) with a thickness of 100 μm, the widths W and L can be about 35.5 mm to 2.7 mm. For example, in the 5G frequency band, in the case of a monopole antenna, a conductor wire is designed such that $\lambda/4$=about 20.8 mm to 1.9 mm in vacuum. In a case where the antenna pattern 31 is arranged in the transparent base 34, the widths W and L are shortened due to the permittivity of the transparent base 34. For example, in a case where the transparent base 34 is polyethylene terephthalate (PET) with a thickness of 100 μm, the widths W and L can be 17.7 mm to 1.4 mm. The size of the cover glass on which the antenna pattern 31 is arranged may be appropriately set according to the widths W and L of the antenna pattern 31. The shape of the cover glass may be a circular, rectangular, polygonal, elliptical, or any other shape that is appropriately determined.

In the above-described embodiment, the antenna pattern 31 is formed in the rectangular sheet shape as viewed in plan, but the shape of the antenna pattern 31 is not limited thereto. For example, in a case where the antenna unit 3 is a dipole antenna, the shape of the antenna pattern 31 may be a pole shape. That is, the shape of the antenna pattern 31 may be appropriately determined according to the type of antenna adopted in the antenna unit 3.

In the above-described embodiment, the plurality of antenna patterns 31 is arranged in the 2×2 array, but arrangement of the plurality of antenna patterns 31 is not limited thereto. The number of antenna patterns 31 is not limited to four.

INDUSTRIAL APPLICABILITY

The wireless terminal according to the present disclosure can be used as a device, such as a smartphone, a mobile phone, a tablet, a wristwatch-type electronic device, a digital camera, a video camera, and a pen-type microscope, and is therefore industrially applicable.

DESCRIPTION OF REFERENCE CHARACTERS

100 Wireless Terminal
1 Main Body
2 Camera Unit
21 Pixel
22 Camera Lens
3 Antenna Unit
31 Antenna Pattern (Transparent Antenna)
311 Metal Thin Wire
312 Mesh Pattern
313 Connection Terminal
314 Cell
32 Antenna Base
33 RFM Base
34 Transparent Base (Film Base)
4 Cover Glass

The invention claimed is:

1. A transparent antenna assembly operable in a wireless terminal, the transparent antenna assembly including:
- a camera unit containing
  - an imaging device having a plurality of pixels arranged as a pixel array located in a pixel plane, and
  - a camera lens located in a lens plane parallel to the pixel plane; and
- an antenna unit containing
  - an antenna base, and
  - an antenna pattern, in or upon the antenna base, in an antenna plane parallel to the lens plane and pixel plane, wherein
    - the camera lens is located between the pixel array and the antenna pattern.

2. The transparent antenna assembly of claim 1, wherein the antenna unit has a transmittance of 80% or more.

3. The transparent antenna assembly of claim 1, wherein the antenna pattern is formed of a plurality of metal thin wires.

4. The transparent antenna assembly of claim 3, wherein a width of each of the metal thin wires is 2.5 μm or less.

5. The transparent antenna assembly of claim 3, wherein a width of each of the metal thin wires is about the same as a pitch of the pixels.

6. The transparent antenna assembly of claim 3, wherein the transparent antenna is arranged at a position lower than a position from the plurality of pixels to a shortest imaging distance of the camera unit.

7. The transparent antenna assembly of claim 1, wherein a cover glass is arranged on an upper surface side of the camera lens so as to cover the camera lens, and the antenna unit is arranged on a lower surface of the cover glass.

8. The transparent antenna assembly of claim 7, wherein the antenna base is about a same size as or larger than the cover glass as viewed in plan view.

9. The transparent antenna assembly of claim 7, wherein the antenna base is greater in size than the camera lens as viewed in plan view.

10. The transparent antenna assembly of claim 1, wherein the antenna pattern has a dimension capable of adapting to a frequency band of 3.7 GHz band or more.

11. The transparent antenna assembly of claim 1, wherein the wireless terminal is a mobile phone, a smartphone, a tablet, or a wristwatch-type electronic device.

12. The transparent antenna assembly of claim 1, wherein the antenna pattern is provided in a film base upon the antenna base.

13. The transparent antenna assembly of claim 1, wherein the antenna unit has two or more antenna patterns.

14. The wireless terminal comprising:
the transparent antenna assembly according to claim 1.

15. The wireless terminal of claim 14, further comprising a main body, wherein
the camera unit is adjacent the main body.

16. The transparent antenna assembly of claim 1, further comprising a main body, wherein
the camera unit is adjacent the main body.

* * * * *